(12) United States Patent
Ormson

(10) Patent No.: US 7,089,019 B2
(45) Date of Patent: Aug. 8, 2006

(54) LOCATION SYSTEMS AND CELLULAR COMMUNICATION NETWORKS

(75) Inventor: Richard Ormson, Berkshire (GB)

(73) Assignee: NEC Corporation, Tokyo (JP)

( * ) Notice: Subject to any disclaimer, the term of this patent is extended or adjusted under 35 U.S.C. 154(b) by 249 days.

(21) Appl. No.: 10/374,497

(22) Filed: Feb. 26, 2003

(65) Prior Publication Data
US 2004/0192344 A1   Sep. 30, 2004

(30) Foreign Application Priority Data
Mar. 1, 2002   (GB) .................................. 0204920.3

(51) Int. Cl.
*H04Q 7/20* (2006.01)
(52) U.S. Cl. .................. 455/456.1; 455/456.2; 455/456.3; 455/456.5; 455/422.1; 455/414.2; 342/357.06; 342/357.1; 342/357.11; 342/450
(58) Field of Classification Search ............. 455/456.1, 455/456.2, 456.3, 456.4, 422.1, 456.5, 414.2; 340/988–996; 342/450–465, 357.1, 357.11, 342/357.06
See application file for complete search history.

(56) References Cited

U.S. PATENT DOCUMENTS

| | | | |
|---|---|---|---|
| 5,999,124 A | 12/1999 | Sheynblat | |
| 6,188,354 B1 | 2/2001 | Soliman et al. | |
| 6,249,252 B1 * | 6/2001 | Dupray | 342/450 |
| 6,704,547 B1 * | 3/2004 | Kuwahara et al. | 455/67.16 |
| 6,950,663 B1 * | 9/2005 | Pihl et al. | 455/456.5 |
| 2001/0008393 A1 * | 7/2001 | Valio et al. | 342/357.02 |
| 2002/0168989 A1 * | 11/2002 | Dooley et al. | 455/456 |
| 2004/0160365 A1 * | 8/2004 | Riley et al. | 342/451 |
| 2005/0064876 A1 * | 3/2005 | Ruutu et al. | 455/456.1 |

FOREIGN PATENT DOCUMENTS

| | | |
|---|---|---|
| CN | 1309775 A | 8/2001 |
| GB | 2 349 532 A | 11/2000 |
| GB | 2 359 699 A | 8/2001 |
| WO | WO 99/61934 | 12/1999 |
| WO | WO 01/86315 A2 | 11/2001 |

* cited by examiner

*Primary Examiner*—George Eng
*Assistant Examiner*—Khai Nguyen
(74) *Attorney, Agent, or Firm*—Scully, Scott, Murphy & Presser, P.C.

(57) ABSTRACT

A location system for use in a mobile communication network includes base stations which transmit known signals at predetermined times for use in deriving location data; a first transmitting and receiving units; a unit for determining times of arrival of the known signals from each base station at each of the first transmitting and receiving units; a unit for determining times of arrival of the known signals from each base station at a second transmitting and receiving unit at an unknown location; a comparing unit for comparing timing differences between the known signals received at the first transmitting and receiving units and the second transmitting and receiving unit; and location determining unit for determining the location of the second unit. Each of the first transmitting and receiving units includes a unit for deriving its location from a further set of received signals such as GPS signals.

4 Claims, 5 Drawing Sheets

LOCATION SYSTEMS AND CELLULAR COMMUNICATION NETWORKS

BACKGROUND OF THE INVENTION

1. Field of the Invention

This invention relates to a location system for use in a mobile communication network such as a cellular communication system.

2. Description of the Related Arts

A number of different mechanisms have been proposed to determine locations of mobile units within a cellular communication network. One of the most commonly used is known as EOTD (enhanced offset time differential, or enhanced observed time differential). This system works by measuring at a mobile unit, the time difference between specific signals arriving from different base stations. Three or more base stations are required for the measurement. This produces an offset between the signals from the different base stations and the offset is reported back to the network. Appropriate processing within the network can then compare the offset with equivalent data from a measurement made at a known fixed location. This comparison then allows the location of the handset to be calculated in relation to the base stations and the known fixed location.

FIG. 1 shows a mobile communication network that comprises three base Stations 24. Two types of transmitting and receiving units, that is, a mobile handset 24 and a fixed position unit 26, receive signals from the base stations. Each of these transmitting and receiving units measures the time difference between known signals from each base station. Each transmitting and receiving unit reports this offset data to the network.

The network knows the locations of all the base stations 20 and of the fixed position unit 26. It is possible to calculate the distance of the mobile handset 24 from each of the three base stations 20 using the offset data. The mathematics required to perform this calculation is well known and need not be reproduced here but will be familiar to those skilled in the art.

The output of the calculations is a series of arcs describing the separation between the mobile handset and each base station. There is an inherent error in each arc due to factors such as the accuracy of the measurement. The location of mobile handset 24 is therefore determined as the center of the overlap area of the arcs, subject to an uncertainty of the size of the overlap area.

The fixed position unit (FPU) 22 can have the data it receives combined with data from a number of other FPUs to derive a map of timing differences over an area. By comparing the measurement data from the mobile units, that is, mobile handsets, and the timing map derived from the FPU, an estimate of the handset location can be obtained.

There is problem with this in that FPUs are generally placed on sites which are already owned by the network (i.e., base station locations). This limits the number of sites and gives a somewhat simplistic view of the propagation of radio waves. EOTD uses the data from these to model the timing differences expected within the area. However, this assumes linearity of timing differences between the known FPUs. This is accurate for direct line propagation but regrettably such propagation is uncommon in cellular systems; reflection and refraction of signals by buildings, hills etc. are significant factors in altering the distance traveled by a radio signal. This leads to differences between the model and reality and thus limits the accuracy of the location determined for the mobile handsets or handheld portables (HHP).

To date, two proposals have been made to try and remove these errors. These are as follows:

(1) Using geographical information system (GIS) to provide data on hills, buildings etc., in the area. Then the propagation modeling is used to deduce the likely effect of the obstacles present. The modeling required is processor intensive and is only valid for the atmospheric conditions defined. Furthermore, the results are all dependant on visible features being in the GIS system. Any additional building or demolition requires the models to be rerun.

(2) To increase the number of FPUs and thus give more reference locations for the model to work with. From the network point of view this is an expensive solution for little benefit, it involves purchases of extra hardware locations but the accuracy of the locations reported increases only with the square root of the number of FPUs.

SUMMARY OF THE INVENTION

The object of the present invention is to provide a location system which does not increase calculation for the propagation model, needs no additional cost and can determine the location of a mobile unit in a cellular communication system or the like with high accuracy.

Another object of the present invention is to provide a transmitting and receiving unit for use in such a location system.

According to one aspect of the present invention, a location system for use in a mobile communication network includes a plurality of base stations which transmit known signals at predetermined times for use in deriving location data, a plurality of first transmitting and receiving units, means for determining times of arrival of the known signals from each base station at each of the first transmitting and receiving units, means for determining times of arrival of the known signals from each base station at a second transmitting and receiving unit at an unknown location, means for comparing timing differences between the known signals received at the first transmitting and receiving units and the second transmitting and receiving unit, and means for determining the location of the second unit therefrom, wherein each of the first transmitting and receiving units includes means to derive its location from a further set of received signals.

According to the present invention, the first transmitting and receiving unit is typically an additional fixed position unit (AFPU), and the second transmitting and receiving unit is typically a mobile unit such as a mobile handset.

According to another aspect of the present invention, a transmitting and receiving unit for use in a location system in a mobile communication network includes means for receiving known signals, means for determining timing of receipt of the known signals, means for transmitting the timing data to the mobile communication network, means to receive signals from other sources, means to determine location data from the signals from the other sources, and means to transmit the location data to the mobile communication network.

We have appreciated that it is possible to increase the apparent number of FPUs at minimal or zero cost to the network operator and completed the present invention. This arises because it is as expected that EOTD will be built into future cellular products as a standard feature. Furthermore, it is expected that with future network standards such as 2.5G and 3G (Third generation) cellular products will be used for applications that previously used fixed links. Some of these will require the deployment of e.g., mains powered equipment left in the same location for long periods. The examples include wireless Internet kiosks, public information systems, CCTV (closed circuit television) units and other units for various applications.

Fixed location equipment will support EOTD measurements by default as it will be based on standard handset design. If the equipment's location can be accurately determined and reported to the network then it can be used as an additional FPU (i.e., AFPU). By making use of this type of equipment as an AFPUs, the number of reference points becomes potentially unlimited. Furthermore, the cost of the AFPUs is low to the network operator.

The additional equipment that an FPU will require in order to operate as an AFPU in an EOTD system is as follows:

(1) A GPS (Global Positioning System) or other satellite based location receiver;

(2) Software to control this location receiver and process the data from its obtained location; and (3) Software to package the location data and send it to the network.

The network portion of the EOTD system will need to be modified to allow it to receive location messages reported from AFPUs. In one embodiment this would by way of SMS or some other short message service, as this requires no change to the network signaling layers.

In another embodiment, the appropriate messaging can be included in the radio resource layer.

In a further embodiment, a signaling can be achieved by establishing (when required) a dedicated call between the AFPU and the network.

In a further embodiment, a mobile unit or HHP can be arranged to operate as an AFPU at times when it is not moving.

The invention is defined in the appended claims to which reference should now be made.

BRIEF DESCRIPTION OF THE DRAWINGS

The invention will now be described in detail by way of example with reference to the accompanying drawings in which.

DETAILED DESCRIPTION OF THE INVENTION

Figure 1:
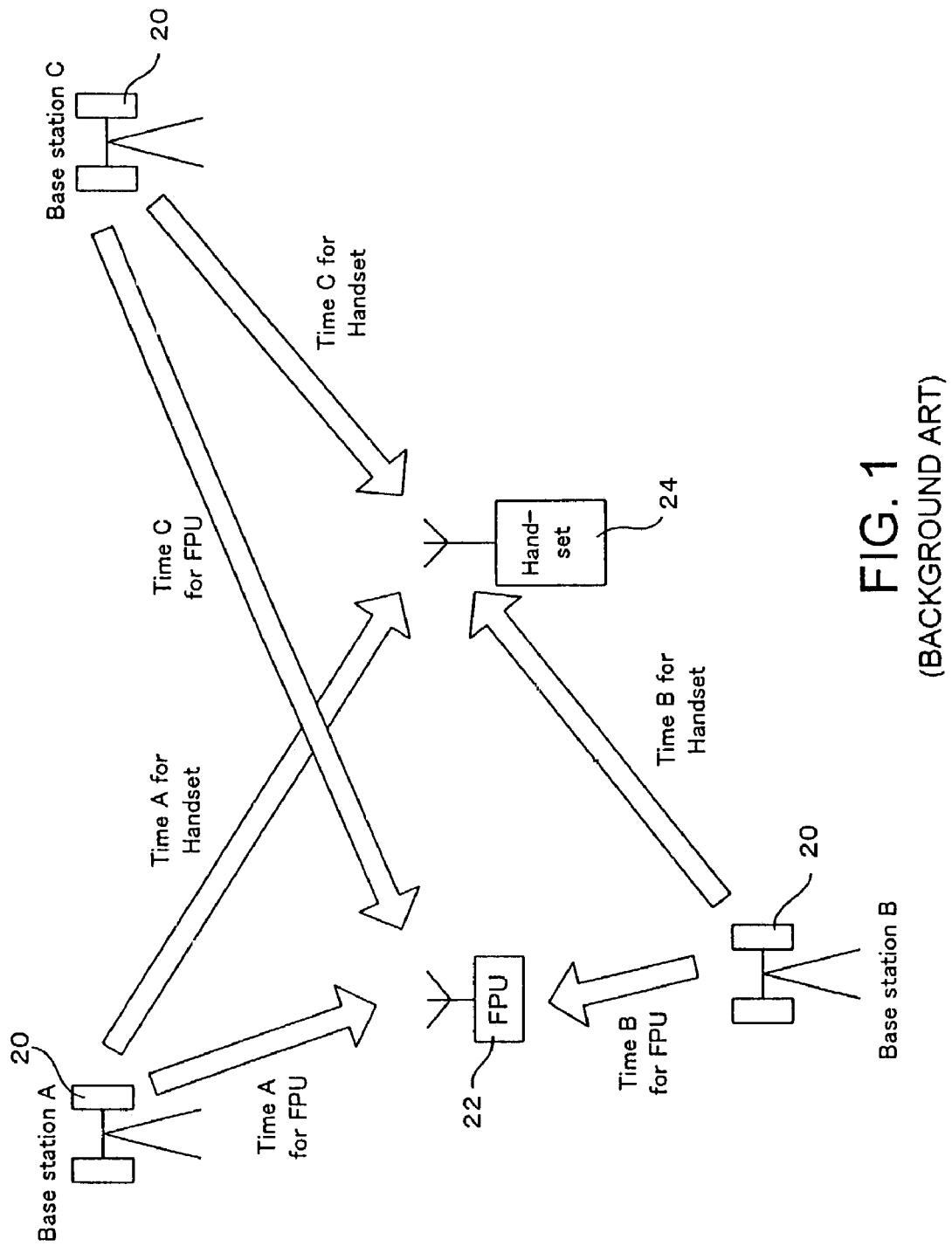
FIG. 1 is a schematic diagram of an EOTD system as discussed above.
Figure 2:
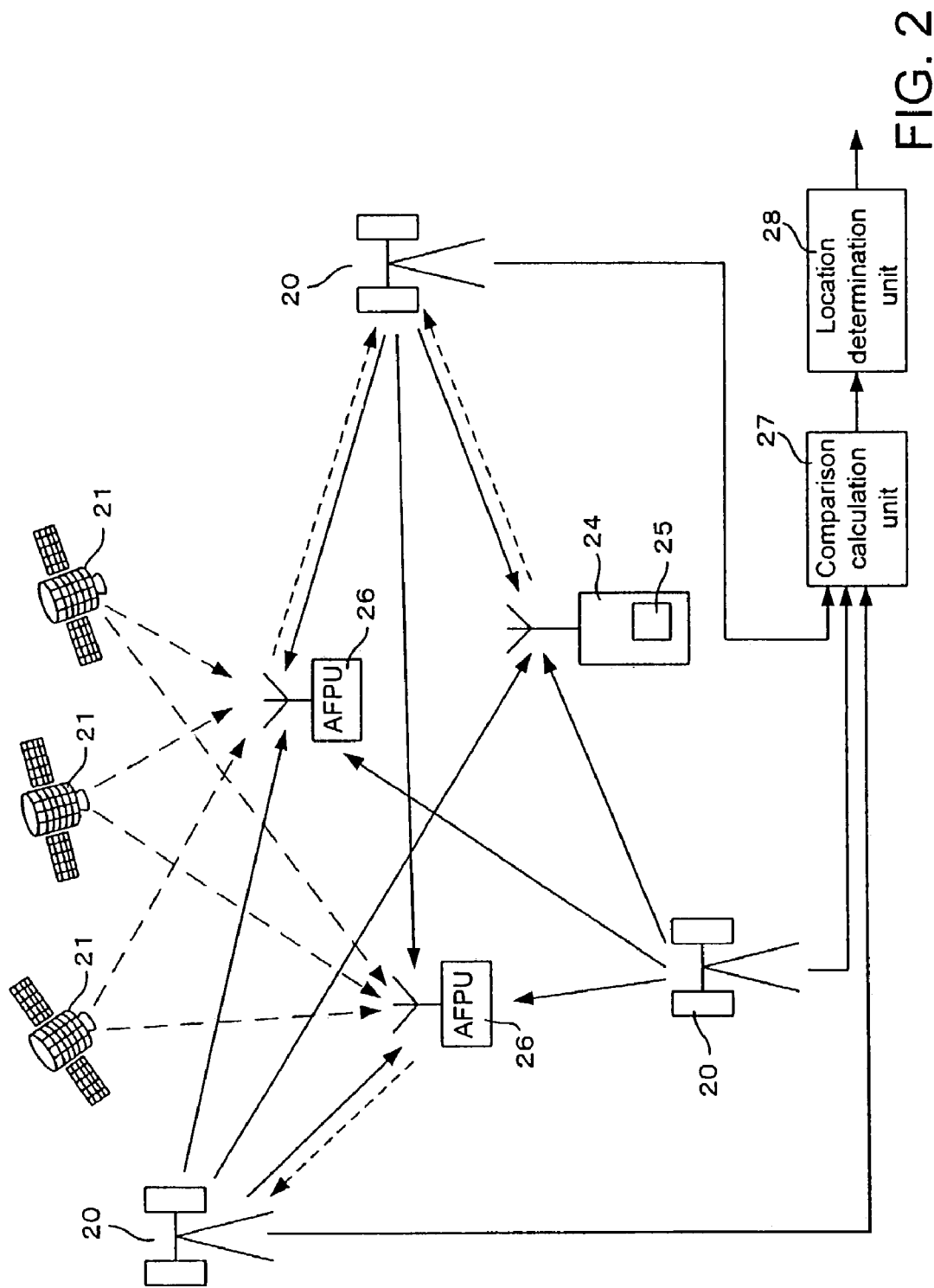
FIG. 2 is a schematic diagram of an example of a mobile communication network to which the present invention can be applied.

A plurality of base stations 20 and a plurality of additional fixed position units (AFPUS) 26 are arranged in a service area of a mobile communication network such as a cellular communication network. In the example illustrated in FIG. 2, there are three base stations and two AFPUS. A mobile unit such a mobile handset can move about the area.

The base stations 20 are disposed on respective known positions to provide communication services to the mobile unit 24. The base stations 20 transmit known signals at predetermined times for use in deriving location data. The mobile unit 24 is provided with functions as an ordinary cellular handset and further provided with a timing determination unit 25 for determining times of arrival of the known signals from each base station. The mobile unit 24 notifies the base station 20 of the timings of the signals from the respective base stations 20.

The AFPU 26 has an ability for determining its current position by a satellite location system such as the GPS. AFPU 26 is provided with a function for receiving signals from GPS satellites 21, a function for receiving signals from the base stations 20 and a function for transmitting an EOTD report to the base station 20.

The network further includes a comparison calculation unit 27 which connects to the base stations 20 and compares the timings obtained at the mobile unit 24 with the timings obtained at the AFPUs 26, and a location determination unit 28 for determining the location of the mobile unit 24 based on the comparison results from the comparison calculation unit 27. The comparison calculation unit 27 and the location determination unit 28 are installed by the network operator as inherent equipment of the network.

Figure 3:
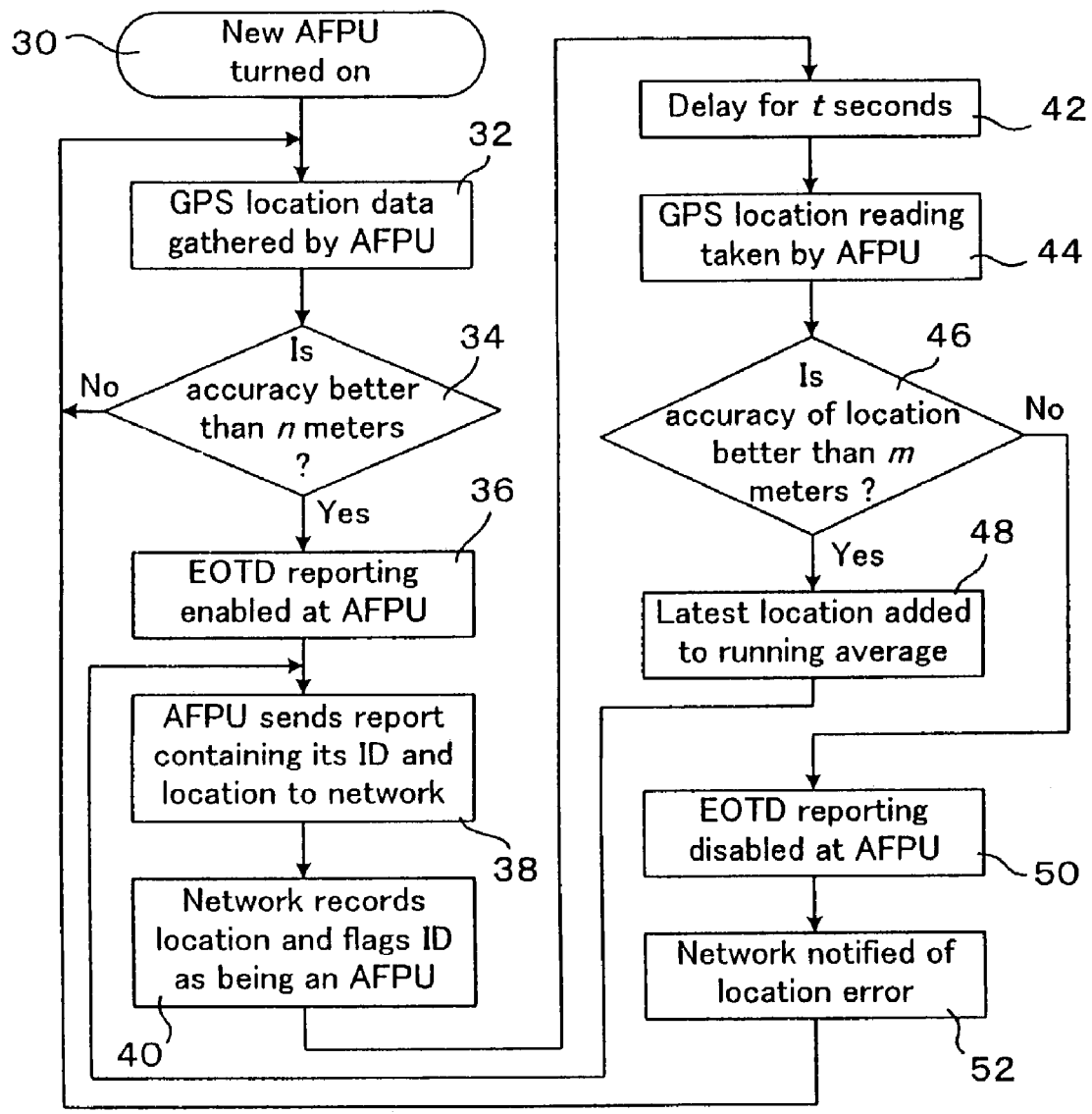
FIG. 3 is a flow diagram showing the process by which an AFPU acquires satellite location data.

FIG. 3 illustrates the sequence of events which happens at an AFPU 26 after it is turned on for the first time at step 30. Its first step is to acquire satellite location data (that is, positioning data) such as GPS data at box 32. There is a small inherent error in satellite location data but this follows a known pattern that can be averaged out over a period of time. This data acquisition continues with the accuracy checked at step 34 until it is better than n meters. The ideal value of n will be determined by the network operator. If the AFPU is moving then the required accuracy will never be obtained until the AFPU stops.

When the AFPU location is known to a sufficient accuracy, an EOTD reporting function is enabled on the AFPU 26 as will be described below in relation to FIG. 3 at box 36. A report containing the ID of the AFPU and its location is then sent to the network at box 38. A notification of the report can be performed over a dedicated connection such as an SMS, a data call, etc., as discussed above. It can also be sent by some form of network messaging.

The message sent to the network contains the location data, the accuracy of the data and an identification (ID) code unique to the AFPU. This code must be in the same form as the AFPU 26 will use in its EOTD reports, or in a form that the network can convert to the EOTD identification.

The network receives this message from the AFPU at box 40 and records the location and ID information in its list of FPUs. Normal EOTD operation then occurs with AFPUs being to all intents and purposes indistinguishable from the normal FPUs as far as the network is concerned.

Because the AFPUs 26 are not entirely within the control of the network operator, a number of safeguards are needed to ensure that an AFPU has not been moved or deactivated. These are as follows:

(1) An AFPU 26 is required to check its location regularly using the satellite system. If the reading is found to be more than m meters away from the running average then it is assumed that the AFPU has been moved. This process takes place at box 42 where the AFPU waits for a period of t seconds and then takes a GPS reading at box 44. A derivation of whether the accuracy of the location is better than m meters is made at step 46. If it is better, then the latest location is added to a running average of location data at box 48 and the new running average is sent to the network at box 38. If the accuracy of the location is not better than m meters at step 46 then the EOTD reporting function of the AFPU 26 is disabled at box 50 which will be discussed below in relation to FIG. 3. The network is notified of this location error at box 52 and the AFPU 26 recommences the gathering of GPS location data at box 32. The network will at this point delete the AFPU from its list of FPUs until such time as it receives a new location notification from the AFPU. Distance m is a variable to be determined. It is related to the chosen value for n. It may be the same as n, or alternatively, a lower or higher figure. The values chosen for m and n will be heavily influenced by the attainable accuracy of the satellite location system used.

The running average derived by the AFPU may use the sliding window method, i.e., using a predetermined number of samples, or alternatively may average all locations since the AFPU was turned on, or may use some other method. The sliding window method is preferred for the purposes of the present embodiment.

(2) If an AFPU 26 fails to respond to a request for EOTD data, then it is possible that the AFPU has been turned off. If this happens, the AFPU is removed from the network's list of FPUs. If the AFPU has been turned off, then it will automatically return to the active list in the network when the AFPU is reactivated using the sequence described above in relation to FIG. 2. However, other reasons may lead to an EOTD response not being sent. It is therefore necessary for each AFPU to send location reports at regular intervals, this being the delay period t shown at box 42 in FIG. 3. The period t is determined at installation. If the sliding window average method is used then the period t should be a fraction of the period of the sliding window average.

(3) The network is arranged only to request EOTD data from AFPUs within its active list. In combination with the above safeguards, this prevents most potential errors. However, as there is a delay between an EOTD request and response while the data is gathered, there is a chance that the AFPU can become invalid during the course of the measurement. Thus an extra check is needed for the AFPU to determine if it is still a valid unit. This is the EOTD reporting enabled check shown at box 36 in FIG. 3, and in more detail in FIG. 4.

It is clearly very important that an AFPU 26 is not moving. The lower limit of location error determined by the EOTD system is the error in the location of the AFPU. In satellite location systems, the accuracy of position is related to the length of time over which measurements can be made. Conventional GPS systems can give an accuracy of better than 1 meter but will usually require many hours of measurement to achieve this. Instantaneous measurements are typically only good to 10 meters or so. Given that current error of an EOTD system is of the order of 10 meters or so this would clearly be of little help.

New satellite technology such as the European Galileo system gives higher instantaneous accuracy than GPS. This will make it possible to use a satellite location unit equipped with HHP as an AFPU even it is moving, or stationary for a short period.

Clearly, for this system to work it will be necessary for customers to purchase equipment with satellite location capability. In time, this is likely to become standard.

Figure 4:
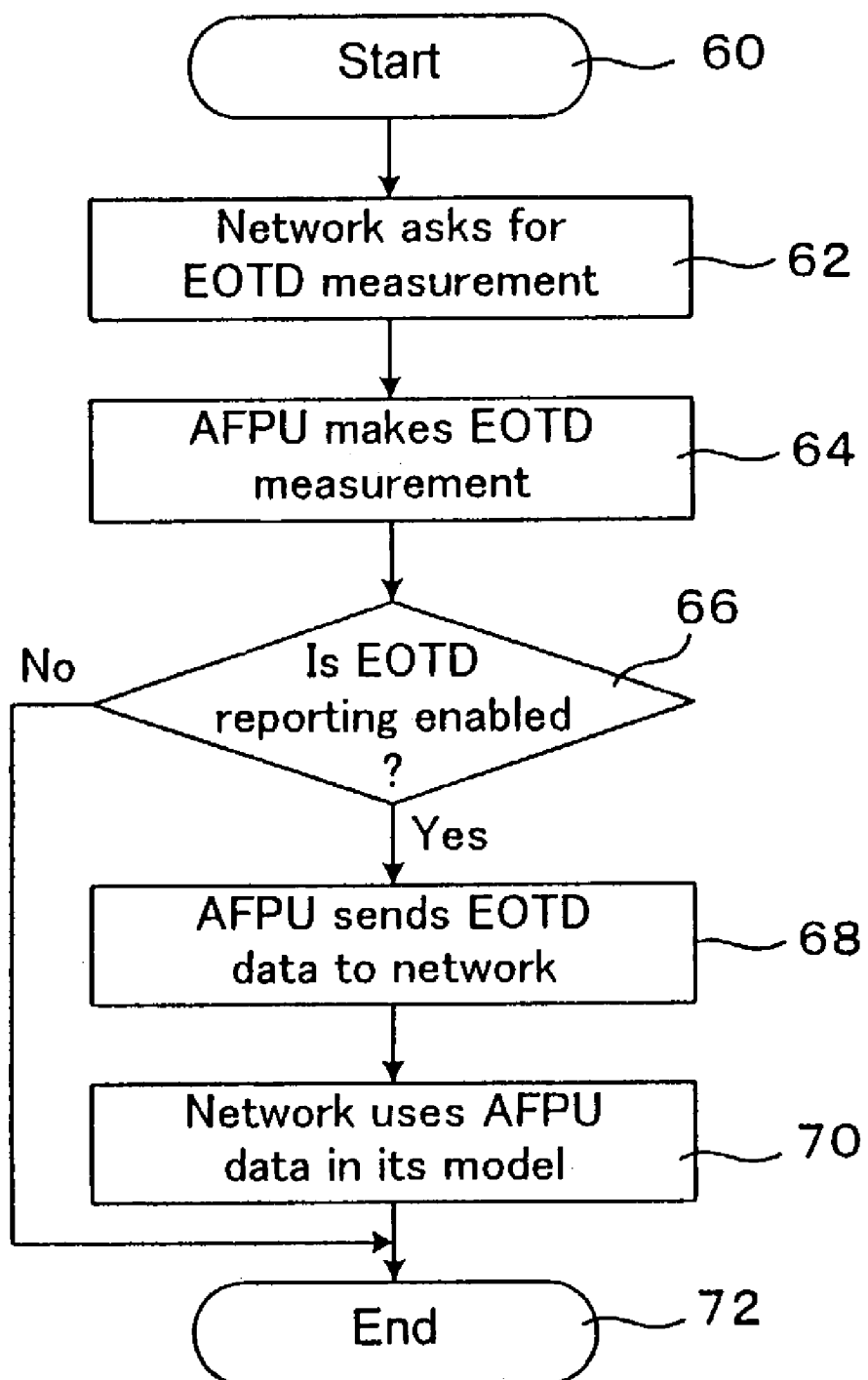
FIG. 4 is a flow diagram showing how an EOTD measurements are enabled and disabled.

FIG. 4 shows how an AFPU 26 determines whether or not it should be reporting to an EOTD request. This process is mentioned at step 60 and box 62, the network asks the AFPU for an EOTD measurement. The AFPU then makes such a measurement at box 64. A determination is then made as to whether or not EOTD reporting should be enabled at step 66. If it is, the EOTD data is sent to the network at box 68 which uses the EOTD data at box 70 in its AFPU model. If EOTD reporting should not be enabled then the process skips straight to the end at step 72.

It will be appreciated that AFPUs 26 can constitute receivers placed at fixed locations such as satellite phone kiosks, on CCTV cameras, etc. There is, however, also the possibility of using HHPs as AFPUs, on the basis that there are usually significant periods when HHPs are not mobile. For example, when people are in their offices their HHPs tend to be in fixed positions, such as in a jacket pocket, or on a desk. These fixed positions can be maintained for significant periods of time thereby enabling them to be used as AFPUs. Improved satellite technology, as discussed above, will enable mobile units to be used in situations where they are stationery for short periods or possibly when they are moving.

Figure 5:
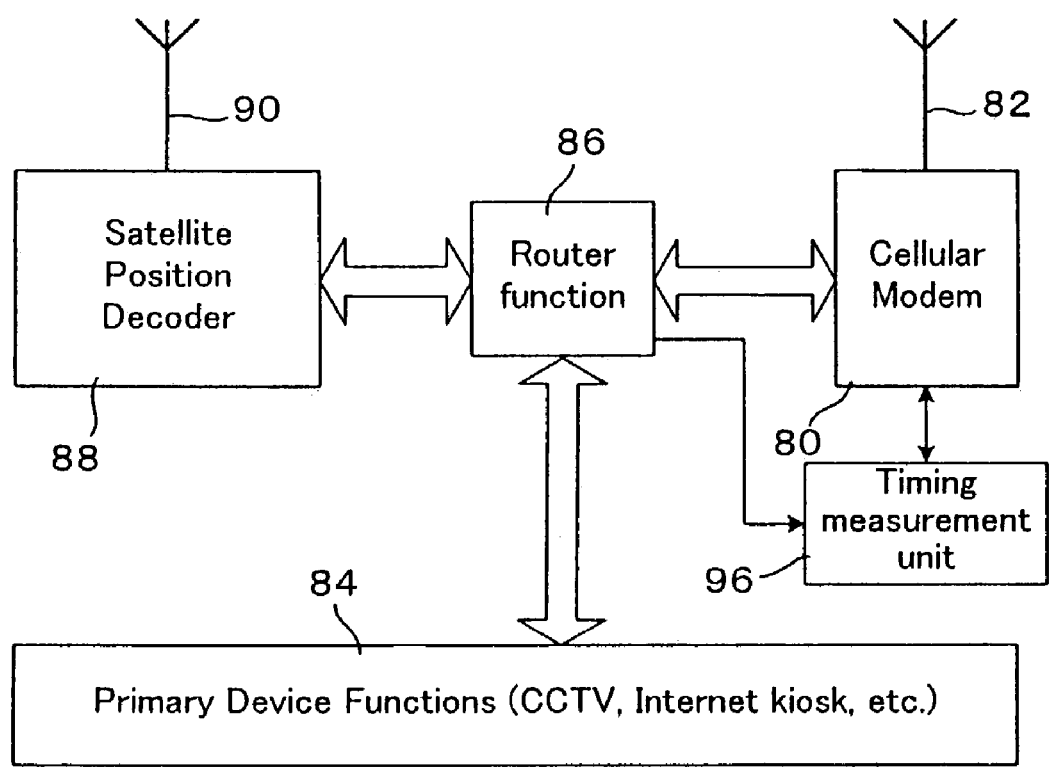
FIG. 5 is a block diagram of the internal components at an AFPU.

FIG. 5 shows a block diagram of the circuitry used at an AFPU 26. The AFPU 26 includes a cellular modem 80 and antenna 82. The antenna 82 receives signals from the base stations 20, transmits signals to the base stations 20, and connects to the cellular modem 80. The modem 80 is coupled to the primary function device 84 (CCTV camera, Internet kiosk, etc.) via a router 86. Timing measurement unit 96 for determining timings between the known signals from the respective base stations 20 is connected to the modem 80. The timing measurement is provided with the EOTD reporting function which responds to an EOTD request received from the network via a base station 20 and performs the EOTD reporting. The determined timings are sent as an EOTD report to the network from the cellular modem 80 via a base station 20.

The router 86 is also coupled to a satellite position decoder 88 which has an antenna 90 for receiving signals from GPS satellites 21. Usually the antenna 90 will be a different antenna to the antenna 82 attached to the cellular modem. The satellite position decoder 88 is configured to derive the position of the AFPU 26 by satellite positioning, to determine the accuracy of the derived position, and to perform the functions of the AFPU 26 described with reference to FIGS. 3 and 4. The router 86 operates to send position signals from the position decoder 88 to the cellular modem 88 for transmission to a base station 20.

While preferred embodiments of the present invention have been described using specific terms, such description is for illustrative purposes only, and it is to be understood that changes and variations may be made without departing from the spirit or scope of the following claims.

What is claimed is:

1. A location system for use in a mobile communication network comprising:

a plurality of base stations which transmit known signals at predetermined times for use in deriving location data;

a plurality of first transmitting and receiving units positioned at known locations, the first transmitting and receiving units not being base stations, and each of the first transmitting and receiving units having a means for deriving its location from a further set of received signals originating from sources external to the mobile communication network;

means for determining times of arrival of the known signals from each base station at each of the first transmitting and receiving units;

means for determining times of arrival of the known signals from each base station at a second transmitting and receiving unit at an unknown location;

means for comparing timing differences between the known signals received at the first transmitting and receiving units and the second transmitting and receiving unit; and means for determining the location of the second transmitting and receiving unit therefrom.

2. The location system according to claim 1, wherein the further set of received signals comprise signals received from a satellite location system.

3. The location system according to claim 2, wherein the satellite location system is the Global Positioning System (GPS), and the means to derive a location from a further set of received signals comprises a GPS receiver.

4. The location system according to claim 1, wherein the mobile communication network comprises a cellular communication network.

* * * * *